United States Patent
Lee et al.

(10) Patent No.: US 9,991,553 B2
(45) Date of Patent: Jun. 5, 2018

(54) ELECTROLYTE FOR LITHIUM AIR BATTERY AND LITHIUM AIR BATTERY INCLUDING THE SAME

(71) Applicant: Samsung Electronics Co., Ltd., Suwon-si, Gyeonggi-do (KR)

(72) Inventors: Dongjoon Lee, Suwon-si (KR); Dongmin Im, Seoul (KR); Kihyun Kim, Seoul (KR); Taeyoung Kim, Seoul (KR); Victor Roev, Suwon-si (KR); Sangbok Ma, Suwon-si (KR); Minsik Park, Hwaseong-si (KR); Wonsung Choi, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 137 days.

(21) Appl. No.: 14/722,230

(22) Filed: May 27, 2015

(65) Prior Publication Data

US 2015/0349365 A1    Dec. 3, 2015

(30) Foreign Application Priority Data

May 27, 2014  (KR) .................. 10-2014-0063825
Apr. 24, 2015  (KR) .................. 10-2015-0058273

(51) Int. Cl.
| | | |
|---|---|---|
| *H01M 10/056* | (2010.01) | |
| *H01M 10/0525* | (2010.01) | |
| *H01M 10/0569* | (2010.01) | |
| *H01M 12/08* | (2006.01) | |
| *H01M 12/04* | (2006.01) | |
| *H01M 8/102* | (2016.01) | |

(52) U.S. Cl.
CPC ......... *H01M 10/056* (2013.01); *H01M 8/102* (2013.01); *H01M 10/0525* (2013.01); *H01M 10/0569* (2013.01); *H01M 12/04* (2013.01); *H01M 12/08* (2013.01); *H01M 2220/20* (2013.01); *H01M 2300/0025* (2013.01); *H01M 2300/0034* (2013.01); *H01M 2300/0082* (2013.01)

(58) Field of Classification Search
None
See application file for complete search history.

(56) References Cited

U.S. PATENT DOCUMENTS

| | | |
|---|---|---|
| 7,282,295 B2 | 10/2007 | Visco et al. |
| 7,691,536 B2 | 4/2010 | Johnson |
| 8,273,497 B2 | 9/2012 | Mizuno |
| 2007/0054186 A1* | 3/2007 | Costello ............ H01M 10/0569 429/200 |
| 2007/0231704 A1 | 10/2007 | Inda |
| 2008/0070087 A1 | 3/2008 | Johnson |
| 2009/0130567 A1* | 5/2009 | Segawa .................. H01G 9/022 429/335 |
| 2011/0059355 A1 | 3/2011 | Zhang et al. |
| 2011/0129739 A1 | 6/2011 | Nakanishi |
| 2011/0223494 A1 | 9/2011 | Feaver et al. |
| 2012/0077084 A1 | 3/2012 | Christensen et al. |
| 2012/0077095 A1 | 3/2012 | Roumi et al. |
| 2012/0115048 A1 | 5/2012 | Roev et al. |
| 2012/0141889 A1 | 6/2012 | Lee et al. |
| 2012/0214073 A1* | 8/2012 | Iwaya ............... H01M 10/0525 429/338 |
| 2012/0276459 A1 | 11/2012 | Im et al. |
| 2013/0040210 A1 | 2/2013 | Mizuno et al. |
| 2013/0108934 A1 | 5/2013 | Lee et al. |
| 2013/0224609 A1 | 8/2013 | Lee et al. |
| 2013/0330639 A1 | 12/2013 | Lee et al. |
| 2014/0011101 A1 | 1/2014 | Ma et al. |
| 2015/0079485 A1 | 3/2015 | Choi et al. |

FOREIGN PATENT DOCUMENTS

| | | |
|---|---|---|
| CN | 101882696 A | 11/2010 |
| EP | 2587585 A1 | 5/2013 |
| JP | 2006049037 A | 2/2006 |
| JP | 2011204918 A | 10/2011 |
| KR | 1020120099013 A | 9/2012 |
| KR | 1020140037850 A | 3/2014 |
| WO | 2012146525 A1 | 11/2012 |

OTHER PUBLICATIONS

European Search Report for European Patent Application No. 15169264.7 dated Dec. 14, 2015.
Korean Office Action for Korean Patent Application for 10-2015-0058273 dated Nov. 29, 2016.

* cited by examiner

Primary Examiner — Sin J Lee
(74) Attorney, Agent, or Firm — Cantor Colburn LLP (57) ABSTRACT

An electrolyte for a lithium air battery and lithium air battery including the electrolyte are provided. The electrolyte includes a compound represented by Formula 1 and a lithium salt:

Formula 1

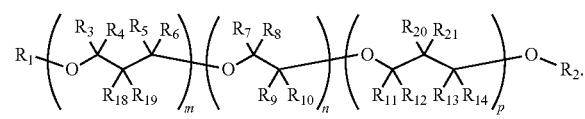

23 Claims, 2 Drawing Sheets

ELECTROLYTE FOR LITHIUM AIR BATTERY AND LITHIUM AIR BATTERY INCLUDING THE SAME

CROSS-REFERENCE TO RELATED APPLICATIONS

This application claims priority to and the benefit of Korean Patent Application No. 10-2014-0063825, filed on May 27, 2014, and Korean Patent Application No. 10-2015-58273, filed on Apr. 24, 2015, in the Korean Intellectual Property Office, and all the benefits accruing therefrom under 35 U.S.C. § 119, the contents of which are incorporated herein in their entirety by reference.

BACKGROUND

1. Field

The present disclosure relates to electrolytes for lithium air batteries, and lithium air batteries including the same.

2. Description of the Related Art

A lithium air battery includes an anode that allows intercalation and deintercalation of lithium ions, a cathode that uses oxygen as a cathode active material and includes a catalyst for oxidizing and reducing oxygen, and a lithium ion-conductive electrolyte disposed between the cathode and the anode.

Lithium air batteries have a theoretical energy of about 3000 Watt-hours per kg (Wh/kg) or greater, which is equivalent to about ten times that of lithium ion batteries. Furthermore, because they are more environmentally friendly and safer in use than lithium ion batteries, lithium air batteries are increasingly being developed. Nonetheless, there remains a need for improved lithium air battery materials.

SUMMARY

Provided is an electrolyte for a lithium air battery with improvement in both oxidation resistance and lithium ion solubility.

Provided is a lithium air battery having improved performance by using the electrolyte.

Additional aspects will be set forth in part in the description which follows and, in part, will be apparent from the description.

According to an aspect, an electrolyte for a lithium air battery includes a compound represented by Formula 1 and a lithium salt:

wherein, in Formula 1, $R_1$ and $R_2$ are each independently a hydrogen atom or a substituted or unsubstituted methyl group represented as $-CR_{15}R_{16}R_{17}$;

$R_3$ to $R_{17}$, and $R_{20}$ to $R_{21}$ are each independently a hydrogen atom, a halogen atom, a nitro group, a cyano group, a carboxyl group, a substituted or unsubstituted $C_1$-$C_{20}$ alkyl group, a substituted or unsubstituted $C_6$-$C_{30}$ aryl group, or a substituted or unsubstituted $C_3$-$C_{20}$ heteroaryl group;

at least one of $R_{18}$ and $R_{19}$ is each independently a fluorine atom, a $C_1$-$C_{10}$ alkyl group that is partially or fully substituted with fluorine, an unsubstituted $C_1$-$C_{10}$ alkyl group, or a $C_6$-$C_{30}$ aryl group that is partially or fully substituted with fluorine, and the remaining $R_{18}$ or $R_{19}$ is a hydrogen atom, a unsubstituted or substituted $C_1$-$C_{10}$ alkyl group, or a unsubstituted or substituted $C_6$-$C_{30}$ aryl group, wherein, optionally, $R_{20}$ and $R_{21}$ may form a substituted or unsubstituted $C_3$-$C_8$ ring, and optionally, $R_{18}$ and $R_{19}$ may form a $C_3$-$C_8$ ring that is partially or fully substituted with fluorine or unsubstituted;

m is in a range of 1 to 1,000,000;

n is in a range of 0 to 1,000,000; and p is 0 to 1,000,000, wherein m+n+p≥3.

According to another aspect, a lithium air battery includes: an anode that allows plating and stripping of lithium ions; a cathode using oxygen as a cathode active material; and the electrolyte including a lithium salt and a compound represented by Formula 1.

Also disclosed is a method of manufacturing an electrolyte for a lithium air battery, the method including dissolving a lithium salt in the compound of Formula 1,

Formula 1 wherein, in Formula 1, $R_1$ and $R_2$ are each independently a hydrogen atom or a substituted or unsubstituted methyl group represented as $-CR_{15}R_{16}R_{17}$;

$R_3$ to $R_{17}$, and $R_{20}$ to $R_{21}$ are each independently a hydrogen atom, a halogen atom, a nitro group, a cyano group, a carboxyl group, a substituted or unsubstituted $C_1$-$C_{20}$ alkyl group, a substituted or unsubstituted $C_6$-$C_{30}$ aryl group, or a substituted or unsubstituted $C_3$-$C_{20}$ heteroaryl group;

at least one of $R_{18}$ and $R_{19}$ is each independently a fluorine atom, a $C_1$-$C_{10}$ alkyl group that is substituted with fluorine, Formula 1 an unsubstituted $C_1$-$C_{10}$ alkyl group, or a $C_6$-$C_{30}$ aryl group that is substituted with fluorine, and the remaining $R_{18}$ or $R_{19}$ is a hydrogen atom, a unsubstituted or substituted $C_1$-$C_{10}$ alkyl group, or a unsubstituted or substituted $C_6$-$C_{30}$ aryl group, wherein, optionally, $R_{20}$ and $R_{21}$ form a substituted or unsubstituted $C_3$-$C_8$ ring, and optionally, $R_{18}$ and $R_{19}$ form a $C_3$-$C_8$ ring that is substituted with fluorine or unsubstituted;

m is in a range of 1 to 1,000,000;
n is in a range of 0 to 1,000,000; and
p is 0 to 1,000,000, wherein m+n+p≥3.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In lithium air batteries which use a non-aqueous electrolyte or an aqueous electrolyte as a lithium ion-conductive medium the oxidation resistance of the lithium ion-conductive electrolyte may have a trade-off relationship with the solubility of lithium ions, which may lower the performance of the lithium air battery.

According to an aspect of the present disclosure, an electrolyte for a lithium air battery includes a compound represented by Formula 1 and a lithium salt.

Formula 1 wherein, in Formula 1, $R_1$ and $R_2$ are each independently a hydrogen atom or a substituted or unsubstituted methyl group represented as $-CR_{15}R_{16}R_{17}$;

$R_3$ to $R_{17}$, and $R_{20}$ to $R_{21}$ are each independently a hydrogen atom, a halogen atom, a nitro group, a cyano group, a carboxyl group, a substituted or unsubstituted $C_1$-$C_{20}$ alkyl group, a substituted or unsubstituted $C_6$-$C_{30}$ aryl group, or a substituted or unsubstituted $C_3$-$C_{20}$ heteroaryl group;

at least one of $R_{18}$ and $R_{19}$ is each independently a fluorine atom, a $C_1$-$C_{10}$ alkyl group that is partially or fully substituted with fluorine, an unsubstituted $C_1$-$C_{10}$ alkyl group or a $C_6$-$C_{30}$ aryl group that is partially or fully substituted with fluorine, and the remaining $R_{18}$ or $R_{19}$ is a hydrogen atom, a unsubstituted or substituted $C_1$-$C_{10}$ alkyl group, or a unsubstituted or substituted $C_6$-$C_{30}$ aryl group, wherein, optionally, $R_{20}$ and $R_{21}$ may form a substituted or unsubstituted $C_3$-$C_8$ ring, and optionally, $R_{18}$ and $R_{19}$ may form a $C_3$-$C_8$ ring that is partially or fully substituted with fluorine or unsubstituted;

m is in a range of 1 to 1,000,000;

n is in a range of 0 to 1,000,000; and p is 0 to 1,000,000, wherein m+n+p≥3.

The compound of Formula 1 may have lithium ion conductivity and good oxidation resistance, good lithium salt solubility, and good oxygen affinity.

In some embodiments, $R_1$ and $R_2$ in Formula 1 may include, each independently, a hydrogen atom, a methyl group, an ethyl group, a propyl group, a fluoromethyl group, a difluoromethyl group, a trifluoromethyl group, a fluoroethyl group, a difluoroethyl group, a trifluoroethyl group, a tetrafluoroethyl group, a pentafluoroethyl group, a fluoropropyl group, a difluoropropyl group, a trifluoropropyl group, a tetrafluoropropyl group, a pentafluoropropyl group, a hexafluoropropyl group, or a heptafluoropropyl group.

In some embodiments, $R_3$ to $R_{17}$ in Formula 1 may include, each independently, a hydrogen atom, a methyl group, an ethyl group, a propyl group, a butyl group, a pentyl group, a hexyl group, or a heptyl group.

For example, at least one of $R_{20}$ and $R_{21}$ may be each independently a fluorine atom, a $C_1$-$C_{10}$ alkyl group that is partially or fully substituted with fluorine, or a $C_6$-$C_{30}$ aryl group that is partially or fully substituted with fluorine, and the remaining $R_{20}$ or $R_{21}$ is a hydrogen atom, a unsubstituted or substituted $C_1$-$C_{10}$ alkyl group, or a unsubstituted or substituted $C_6$-$C_{30}$ aryl group, wherein optionally, $R_{20}$ and $R_{21}$ may form a $C_3$-$C_8$ ring that is partially or fully substituted with fluorine.

For example, at least one of $R_{18}$ and $R_{21}$ may each independently include a fluorine atom, a fluoromethyl group, a difluoromethyl group, a trifluoromethyl group, a fluoroethyl group, a difluoroethyl group, a trifluoroethyl group, a tetrafluoroethyl group, a pentafluoroethyl group, a fluoropropyl group, a difluoropropyl group, a trifluoropropyl group, a tetrafluoropropyl group, a pentafluoropropyl group, a hexafluoropropyl group, or a heptafluoropropyl group, and the remaining $R_{18}$ to $R_{21}$ may be a hydrogen, a methyl group, an ethyl group, a propyl group, or a phenyl group, wherein optionally, $R_{18}$ and $R_{19}$ and/or $R_{20}$ and $R_{21}$ may form a cyclopropane, a cyclobutane, a cyclopentane, a cyclohexane, a cycloheptane, a cyclonorbornane or a bicyclooctane that are fully or partially substituted with fluorine, and the remaining $R_{18}$ and $R_{19}$ or $R_{20}$ and $R_{21}$ may form unsubstituted cyclopropane, unsubstituted cyclobutane, unsubstituted cyclopentane, unsubstituted cyclohexane, unsubstituted cycloheptane, unsubstituted cyclonorbornane, or unsubstituted bicyclooctane.

In some embodiments, m may be in a range of 1 to 1,000, n may be in a range of 0 to 1,000, and p may be in a range of 1 to 1,000. In some other embodiments, m may be in a range of 1 to 100, n may be in a range of 0 to 100, and p may be in a range of 0 to 100. In still other embodiments, m may be in a range of 1 to 10, n may be in a range of 0 to 10, and p may be in a range of 0 to 10.

In some embodiments, the compound of Formula 1 may be a compound represented by Formula 1a or 1 b.

Formula 1a wherein, in Formula 1a, $R_{18}$ to $R_{21}$ may be each independently a fluorine atom, a partially or fully fluorinated C1-C10 alkyl group, or a partially or fully fluorinated C6-C20 aryl group; and $R_{15}$, $R_{16}$, and $R_{17}$ may be each independently a hydrogen, a substituted $C_1$-$C_{20}$ alkyl group or an unsubstituted $C_1$-$C_{20}$ alkyl group.

Formula 1b wherein, in Formula 1 b, $R_{18}$ to $R_{21}$ may be, each independently, a fluorine atom, a partially or fully fluorinated C1-C10 alkyl group or a partially or fully fluorinated C6-C20 aryl group;

R may be a hydrogen or fluorine; and k may be in a range of 0 to 5.

For example, the compound of Formula 1 may be selected from compounds represented by Formulae 2 to 5.

For example, the amount of the compound of Formula 1 may be in a range of about 15 parts to about 97 parts by weight, for example about 20 parts to about 90 parts by weight based on 100 parts by weight of the total weight of the electrolyte. When the amount of the compound of Formula 1 is within this range, the electrolyte may have improved oxidation resistance and improved solubility of lithium salt.

The compound of Formula 1 acts as a solvent for dissolving the lithium salt. The lithium salt is dissolved in the compound of Formula 1. The resultant acts as a source for providing lithium ions in the battery, and it facilitates movement of the lithium ions.

Non-limiting examples of the lithium salt include may include at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, LiF, LiBr, LiCl, LiI, or $LiB(C_2O_4)_2$ (LiBOB; lithium bis(oxalato) borate). In some embodiments, the lithium salt in the electrolyte for a lithium air battery may be a lithium sulfonimide compound.

For example, the lithium sulfonimide compound may be lithium fluoroalkylsulfonimide, lithium fluoroarylsulfonimide, or lithium fluoroalkylarylsulfonimide, wherein each contains 1 to 20 carbon atoms, 1 to 16 carbon atoms, or 1 to 10 carbon atoms.

Non-limiting examples of the lithium sulfonimide compound include $Li(FSO_2)_2N$, $Li(CF_3SO_2)_2N$, $Li(C_2F_5SO_2)_2N$, $LiN(C_pF_{2p+1}SO_2)(C_qF_{2q+1}SO_2)$ (where p and q may differ and may be each independently an integer of 1 to 20), $LiN((SO_2)_2C_pF_{2p})$ (where p may be an integer of 1 to 10), $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$ (where p may be an integer of 1 to 10), or $LiN(C_{10}F_7SO_2)(C_pF_{2p+1}SO_2)$ (where p may be an integer of 1 to 10).

The electrolyte for a lithium air battery may further include a nonaqueous organic solvent. Non-limiting examples of the nonaqueous organic solvent include methylbutyl ether, diethyl ether, ethyl butyl ether, dibutyl ether, polyethylene glycol dimethyl ether, tetraethylene glycol dimethyl ether; cyclohexanone, dioxane; dimethoxyethane, 2-methyltetrahydrofuran, 2,2-dimethyltetrahydrofuran, 2,5-dimethyltetrahydrofuran, tetrahydrofuran; dimethyl acetate, ethyl acetate, n-propyl acetate, dimethylacetate, methylpropionate, ethyl propionate; methyl formate, or ethyl formate; dimethyl carbonate, diethyl carbonate, ethyl methyl carbonate, dipropyl carbonate, methyl propyl carbonate, ethyl propyl carbonate, ethylene carbonate, propylene carbonate, butylene carbonate, polyethylene carbonate; γ-butyrolactone, decanolide, valerolactone, mevalonolactone, caprolactone; diglyme, triglyme, tetraglyme; acetonitrile, benzonitrile, nitromethane, nitrobenzene, triethylamine, triphenylamine, tetraethylene glycol diamine; dimethylformamide, diethylformamide, N-methylpyrrolidone; dimethyl sulfone, tetramethylene sulfone, triethylphosphineoxide, 1,3-dioxolane, or sulfolane.

In some embodiments, the electrolyte for a lithium air battery may further include a lithium ion-conductive polymer, in addition to the compound of Formula 1. For example, the lithium ion-conductive polymer may include polyethylene oxide, polyacrylonitrile (PAN), or polyester.

In the electrolyte for a lithium air battery, the compound of Formula 1 may include a fluorine atom in a selected position to improve the oxidation resistance, oxygen affinity, and salt solubility of the electrolyte. As used herein, the term "oxidation resistance" refers to the resistance to oxidation of the electrolyte by a potential difference at an electrode or by reaction with an oxidation product of lithium ions. As used herein, the term "oxygen affinity" refers to the ability of oxygen permeability of the electrolyte. As used herein, the term "salt solubility" refers to the solubility of the lithium salt of the electrolyte.

For example, in the compound of Formula 1, a fluorine atom or a group substituted with a fluorine atom may be directly bound to a carbon atom in the middle of a propyl group between oxygen atoms, thereby improving the oxidation resistance, oxygen affinity, and salt solubility of the electrolyte.

A conventional ether electrolyte may have improved oxidation resistance, but reduced lithium salt solubility, by substitution of a hydrogen atom with a fluorine atom. However, the compound of Formula 1 may be improved both in oxidation resistance and salt solubility by the substitution, of all or some hydrogen atoms with fluorine atoms on the carbon atom in the middle of the propyl group between oxygen atoms. The oxygen affinity of the electrolyte may also be improved by the compound of Formula 1.

According to another aspect, a lithium air battery includes: an anode that allows plating and stripping of lithium ions; a cathode using oxygen as a cathode active material; and an electrolyte according to any of the above-described embodiments that include a lithium salt and a compound represented by Formula 1 as described above.

The amount of the compound of Formula 1 may be in a range of about 15 parts to about 97 parts by weight, for example about 20 parts to about 90 parts by weight based on 100 parts by weight of the total weight of the electrolyte. When the amount of the compound of Formula 1 is within this range, the electrolyte may have improved conductivity.

According to another aspect of the present disclosure, the electrolyte includes at least one selected from an ionic liquid and ionic liquid.

The inorganic filler may be any filler as long as the filler is commonly used in a lithium air battery. For example, the inorganic filler may be at least one selected from $BaTiO_3$, $SiO_2$, $TiO_2$, $ZrO_2$, and zeolite.

The amount of the inorganic filler may be in the range of about 0.1 to about 20 parts by weight based on 100 parts by weight of the total weight of the compound of Formula 1 and a lithium salt.

The lithium air battery may further include a lithium ion-conductive layer disposed between the anode and the electrolyte. The lithium ion-conductive layer includes an ion-conductive inorganic particle.

The ion-conductive inorganic particle may be at least one selected from a glassy active metal ion conductor, an amorphous active metal ion conductor, a ceramic active metal ion conductor, a glass-ceramic active metal ion conductor, or a combination thereof. For example, the ion-conductive inorganic particle may be at least one selected from $Li_{1+x+y}Al_xTi_{2-x}Si_yP_{3-y}O_{12}$ (where 0<x<2 and 0≤y<3), $BaTiO_3$, $Pb(Zr,Ti)O_3(PZT)$, $Pb_{1-x}La_xZr_{1-y}Ti_yO_3(PLZT)$ (where 0≤x<1 and 0≤y<1), $PB(Mg_3Nb_{2/3})O_3$—$PbTiO_3(PMN-PT)$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$ (where 0<x<2 and 0<y<3), lithium aluminium titanium phosphate ($Li_xAl_yTi_z(PO_4)_3$ (where 0<x<2, 0<y<1, and 0<z<3), $Li_{1+x+y}(Al,Ga)_x(Ti,Ge)_{2-x}Si_yP_{3-y}O_{12}(O_y,Ge)$ (where 0<y<1), lithium lanthanum titanate ($Li_xLa_yTiO_3$, where 0<x<2 and 0<y<3), lithium germanium thiophosphate (LixGeyPzSw, where 0<x<4, 0<y<1, 0<z<1, and 0<w<5), lithium nitride-based glass ($Li_xN_y$, where 0<x<4 and 0<y<2), $SiS_2(Li_xSi_yS_z)$-based glass (where 0<x<3, 0<y<2, and 0<z<4), $P_2S_5(Li_xP_yS_z)$-based glass (where 0<x<3, 0<y<3, and 0<z<7), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, Garnet-based ceramics ($Li_{3+x}La_3M_2O_{12}$) (0≤x≤5) (where M is Te, Nb, or Zr), and a combination thereof.

In some embodiments, the lithium air battery may further include a second electrolyte disposed between the anode and the lithium ion-conductive layer. For example, the second electrolyte may be a solid polymer electrolyte or an inorganic solid electrolyte.

Figure 1:
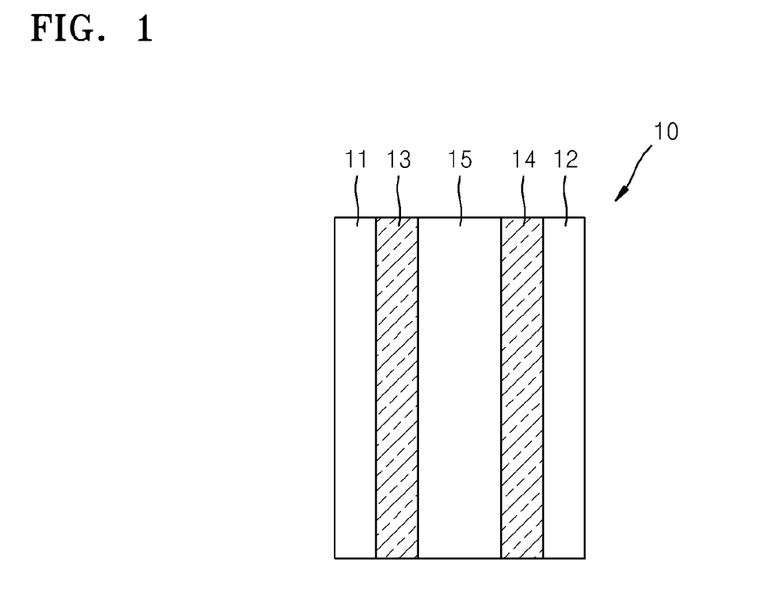
FIG. 1 is a schematic view of an embodiment of a lithium air battery.

FIG. 1 is a schematic view of a lithium air battery 10 according to an embodiment. Referring to FIG. 1, the lithium air battery 10 includes a first current collector 11, a second current collector 12, a cathode 13, an anode 14, and an electrolyte disposed between the cathode 13 and the anode 14 and including a compound of Formula 1 described above and a lithium salt (hereinafter, referred to as "first electrolyte"). The cathode 13 may be disposed on the first current collector 11. In the cathode 13, oxidation and reduction of oxygen used as an active material take place. The anode 14 may be disposed on the second current collector 12. In the anode 14, oxidation and reduction of lithium metal take place. The first electrolyte 15 may enable conduction of lithium ions between the cathode 13 and the anode 14.

A porous structure in a net shape or mesh shape may be used as the first and second current collectors 11 and 12 to facilitate diffusion of oxygen.

For example, a porous metal plate made of, for example, stainless steel, nickel, or aluminum may be used as the first and second current collectors 11 and 12. Materials for the first and second current collectors 11 and 12 are not particularly limited, and any appropriate material for a current collector available in the art may be used. The first and second current collectors 11 and 12 may be coated with an anti-oxidation metal or an alloy thereof to prevent oxidation.

The cathode 13 that uses oxygen as a cathode active material may include a porous conductive material. Any porous and conductive material, for example, a porous carbonaceous material, may be used without limitations as the cathode 13. Suitable porous carbonaceous materials may be carbon black, graphite, graphene, activated carbon, carbon nanotubes, and carbon fibers. A metallic conductive material, for example, metal fiber, metal mesh, or the like, may be used as the cathode 13. For example, metal powder of copper, silver, nickel, aluminum, or the like may be used as the cathode 13. Organic conductive materials such as polyphenylene derivatives may also be used as the cathode 13. The above-listed conductive materials may be used alone or in combination.

The cathode 13 may further include a catalyst for facilitating oxidation or reduction of oxygen. Non-limiting examples of the catalyst include precious metal-based catalysts, such as platinum (Pt), gold (Au), silver (Ag), palladium (Pd), ruthenium (Ru), rhodium (Rh), and osmium (Os); oxide-based catalysts, such as manganese oxide, iron oxide, cobalt oxide, and nickel oxide; or organic metal-based catalysts, such as cobalt phthalocyanine. Any appropriate catalysts for oxidation and reduction of oxygen available in the art may be used.

The catalyst may be supported on a support. Non-limiting examples of the support include oxide, zeolite, clay mineral, and carbon. The oxide may include at least one oxide of alumina, silica, zirconium oxide, and titanium dioxide. The oxide may be an oxide that includes at least one metal selected from cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Non-limiting examples of the carbon include carbon black, such as Ketjen black, acetylene black, channel black, and lamp black; graphite, such as natural graphite, artificial graphite, and expanded graphite; activated carbon; and carbon fibers. Any appropriate materials available as supports in the art may be used.

The cathode 13 may further include a binder. The binder may include a thermoplastic resin or a thermocurable resin. Non-limiting examples of the binder include polyethylene, polypropylene, polytetrafluoroethylene (PTFE), polyvinylidene fluoride (PVDF), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, which may be used alone or in combination. Any appropriate binders available in the art may be used.

The cathode 13 may be manufactured as follows. For example, a catalyst for oxidation/reduction of oxygen, a conductive material, and a binder may be mixed together, and then an appropriate solvent may be added thereto to prepare a cathode slurry. The cathode slurry may be coated and dried on a surface of the first current collector 11, optionally followed by press-molding to improve the density of the cathode 13, thereby manufacturing the cathode 13. Optionally, the cathode 13 may include a lithium oxide. Optionally, the cathode 13 may not include the catalyst for oxidation/reduction of oxygen.

The anode 14 may include, but is not limited to, lithium metal, a lithium metal-based alloy, or a material that allows alloying and dealloying, e.g., intercalation and deintercalation of lithium ions.

The anode 14 may determine the capacity of the lithium air battery 10. The lithium metal-based alloy may be, for example, an alloy of lithium with aluminum (Al), tin (Sn), magnesium (Mg), indium (In), calcium (Ca), germanium (Ge), antimony (Sb), bismuth (Bi), or lead (Pb).

The porous cathode 13 may be fully or partially impregnated with the first electrolyte 15.

Figure 2:
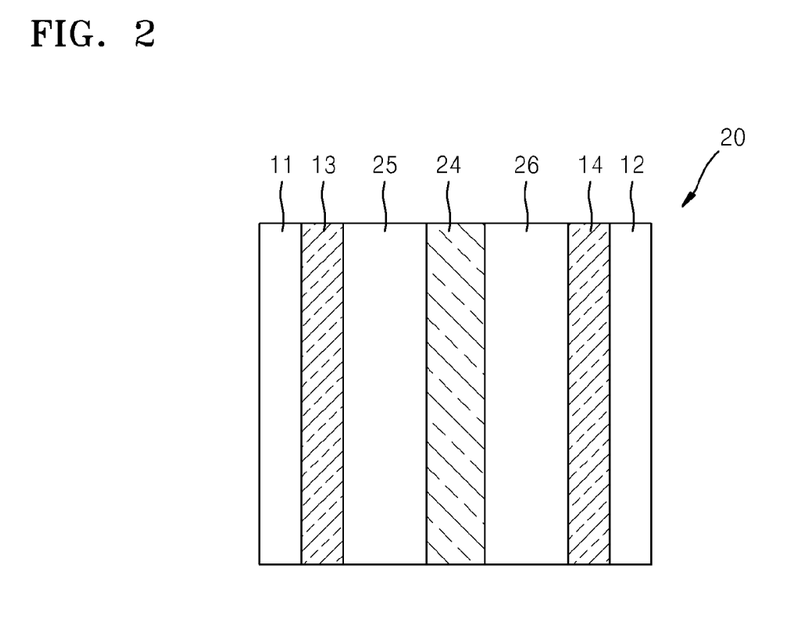
FIG. 2 is a schematic view of a structure of an embodiment of a lithium air battery cell.

FIG. 2 is a schematic view of a structure of a lithium air battery cell 20 according to another embodiment.

Referring to FIG. 2, the lithium air battery cell 20 includes a first current collector 11, a second current collector 12, a cathode 13, an anode 14, a lithium ion-conductive layer 24 disposed between the cathode 13 and the anode 14, an electrolyte 25 (hereinafter, referred to as a first electrolyte) disposed between the cathode 13 and the lithium ion conductive layer 24 and including the compound of Formula 1 described above and a lithium salt, and a second electrolyte 26 between the anode 14 and the lithium ion-conductive layer 24.

In FIG. 2, the anode 14, the second electrolyte 25, and the lithium ion-conductive layer 24 may be collectively called a protected anode.

The cathode 13, the anode 14, and the first electrolyte 25 in FIG. 2 correspond to the cathode 13, the anode 14, and the first electrolyte 15 in FIG. 1, respectively, and thus detailed descriptions thereof will be omitted here.

The lithium ion-conductive layer 24 having lithium-ion conductivity may include an ion-conductive inorganic particle.

The second electrolyte 26 may be, but is not limited to, a solid polymer electrolyte or an inorganic solid electrolyte. The polymer electrolyte membrane may be, for example, a polyethylene oxide membrane, a polyacrylonitrile membrane, or a polyester membrane.

For example, the solid polymer electrolyte membrane may be prepared by mixing a lithium ion-conductive polymer and a lithium salt.

The lithium salt may include at least one selected from $LiPF_6$, $LiBF_4$, $LiSbF_6$, $LiAsF_6$, $LiN(SO_2C_2F_6)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, LiF, LiBr, LiCl, LiI, and $LiB(C_2O_4)_2$ (LiBOB; lithium bis(oxalato)borate).

For example, the inorganic solid electrolyte may be $Cu_3N$, $Li_3N$, or LiPON.

The second electrolyte 26 may be a lithium ion-conductive solid electrolyte membrane.

The lithium ion-conductive solid electrolyte may be a glass-ceramic solid electrolyte, or a laminated structure of a glass-ceramic solid electrolyte and a solid polymer electrolyte. A "glass-ceramic" refers to a polycrystalline material generated through controlled crystallization of base glass. The lithium ion-conductive solid electrolyte membrane will now be described in greater detail.

The lithium ion-conductive solid electrolyte may include an inorganic material including lithium ion-conductive glass, a lithium ion-conductive crystal (ceramic or glass-ceramic), or a combination thereof. For example, the lithium ion-conductive solid electrolyte membrane may include an oxide, in consideration of chemical stability.

When the lithium ion-conductive solid electrolyte includes a large amount of lithium ion-conductive crystals, a high ionic conductivity may be attainable. For example, the lithium ion-conductive solid electrolyte membrane may include about 50 wt. % or greater, about 60 wt. % or greater, or about 70 wt. % or greater of lithium ion-conductive crystals, based on the total weight of the lithium ion-conductive solid electrolyte membrane.

The lithium ion-conductive crystals may be lithium ion-conductive particles having a Perovskite structure, such as $Li_3N$, LISICON, $La_{0.55}Li_{0.35}TiO_3$, and the like, $LiTi_2P_3O_{12}$ crystals having a NASICON structure, or a glass-ceramic able to precipitate these crystals.

For example, the lithium ion-conductive crystals may be $Li_{1+x+y}(Al_q, Ga_{1-q})_x(Ti_r, Ge_{1-r})_{2-x}Si_yP_{3-y}O_{12}$ crystals (wherein $0 \le x \le 1$, $0 \le y \le 1$, $0 \le q \le 1$, and $0 \le r \le 1$ and for example, $0 \le x \le 0.4$, $0 \le y \le 0.6$, $0 \le q \le 1$ and $0 \le r \le 1$, or $0.0 \le x \le 0.3$, $0.10 \le y \le 0.4$, $0 \le q \le 1$ and $0 \le r \le 1$). Crystals that do not include grain boundaries impairing conduction of ions may be advantageous in terms of conductivity. For example, a glass-ceramic substantially almost free of pores or grain boundaries that impair conduction of ions may have high ionic conductivity and high chemical stability.

Non-limiting examples of the lithium ion-conductive glass-ceramic include lithium-aluminum-germanium-phosphate (LAGP), lithium-aluminum-titanium-phosphate (LATP), and lithium-aluminum-titanium-silicon-phosphate (LATSP).

For example, when a parent glass with a composition of $Li_2O-Al_2O_3-TiO_2-SiO_2-P_2O_5$ is thermally treated for crystallization, a main crystal phase of $Li_{1+x+y}Al_xTi_{2-x}Si_yP_{3-y}O_{12}$ ($0 \le x \le 1$ and $0 \le y \le 1$) may be obtained. For example, $0 \le x \le 0.4$ and $0 \le y \le 0.6$, and in some embodiments, $0.1 \le x \le 0.3$ and $0.1 \le y \le 0.4$.

As used herein, the pores or grain boundaries blocking conduction of ions refer to a structure that lowers the lithium ion conductivity of the entire inorganic material including lithium ion-conductive crystals to $\frac{1}{10}$ or less of the lithium ion conductivity of the lithium ion-conductive crystals of the inorganic material.

The terms "glass-ceramic" refers to a material obtained by thermally treating glass to educe crystalline phases from glass phases in the glass, the glass-ceramic including amorphous solid and crystals. The glass-ceramic may also refer to a material completely phase-transitioned from glass phases to crystalline phases, for example, a material with a 100% by weight of degree of crystallization. In some embodiments the glass-ceramic may include a material having a 100% by weight of degree of crystallization. The glass-ceramic includes nearly zero pores among crystal particles or in a crystal even when fully crystallized 100%.

Since the lithium ion-conductive solid electrolyte includes a large amount of glass-ceramic, a high ionic conductivity may be obtained. The lithium ion-conductive solid electrolyte may include about 80 parts by weight per 100 parts by weight (wt. %) or greater of lithium ion-conductive glass-ceramic, and in some embodiments, about 85 wt. % or greater, or about 90 wt. % or greater to obtain high ionic conductivities.

A $Li_2O$ component in the glass-ceramic may serve as a $Li^+$ ion carrier and is an effective component for lithium-ion conductivity. To easily obtain a high ionic conductivity, the amount of the $Li_2O$ component may be about 12%, about 13%, or about 14% based on the total weight of the glass-ceramic. When the amount of the $Li_2O$ component is too high, the thermal stability of the glass-ceramic and the conductivity of the glass-ceramic may highly likely deteriorate. Accordingly, an upper limit in the amount of the $Li_2O$ component may be about 18%, 17%, or 16%.

An $Al_2O_3$ component in the glass-ceramic may improve the thermal stability of the parent glass and may improve lithium-ion conductivity by being present as $Al^{3+}$ ions in a crystal phase. To facilitate these effects, a lower limit in the amount of the $Al_2O_3$ component may be about 5%, about 5.5%, or about 6%. When the amount of the $Al_2O_3$ component exceeds 10%, the thermal stability of the glass-ceramic and the conductivity of the glass-ceramic may highly likely deteriorate. Accordingly, an upper limit in the amount of the $Al_2O_3$ component may be about 10%, about 9.5%, or about 9%.

A $TiO_2$ component in the glass-ceramic, as a component in a crystal phase, is an effective component involved in the formation of glass and the crystal phase. To facilitate glass formation and educe a main crystal phase thereof on the glass to obtain a higher ionic conductivity, a lower limit in the amount of the $TiO_2$ component may be about 35%, about 36%, or about 37%. When the amount of the $TiO_2$ component is too high, the thermal stability and the conductivity of the glass-ceramic may highly likely deteriorate. Accordingly, an upper limit in the amount of the $Al_2O_3$ component may be about 45%, about 43%, or about 42%.

A $SiO_2$ component in the glass-ceramic may improve the melting properties and thermal stability of the parent glass and may improve lithium-ion conductivity by being present as $Si^{4+}$ ions in a crystal phase. To facilitate these effects, a lower limit in the amount of the $SiO_2$ component may be about 1%, about 2%, or about 3%. When the amount of the $SiO_2$ component is too high, the conductivity of the glass ceramic may highly likely deteriorate. Accordingly, an upper limit in the amount of the $SiO_2$ component may be about 10%, or about 7%.

A $P_2O_5$ component in the glass-ceramic, as a component in a crystal phase, is an effective component involved in the formation of glass and the crystal phase. When the amount of the $P_2O_5$ component is less than about 30%, glassification may not occur. Accordingly, a lower limit in the amount of the $TiO_2$ component may be about 30%, or about 32%. When the amount of the $P_2O_5$ component exceeds 40%, the crystal phase may not be educed from glass, and desired characteristics may not be attainable. Accordingly, an upper limit in the amount of the $P_2O_5$ component may be about 40%, about 39%, or about 38%.

When the glass-ceramic has the above-described composition, glass may be easily formed by casting molten glass, and the glass-ceramic in a crystal phase obtained by thermally treating the glass may have a high lithium-ion conductivity of about $1\times10^{-3}$ Siemens per centimeter ($S \cdot cm^{-1}$).

When a glass-ceramic having a different, but similar crystalline structure as above, is used, the $Al_2O_3$ component and the $TiO_2$ component may be partially or fully substituted with a $Ga_2O_3$ component and a $GeO_2$ component, respectively. In some other embodiments, to lower a melting point of glass-ceramic or improve the stability of glass, a trace of an additional material may be used in a range of amounts that do not seriously deteriorate ionic conductivity.

The lithium ion-conductive solid electrolyte may further include a solid polymer electrolyte, in addition to the glass-ceramic. For example, the solid polymer electrolyte may be a polyethylene oxide doped with a lithium salt. The solid polymer electrolyte may include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, or $LiAlCl_4$.

The solid polymer electrolyte may form a laminated structure with the glass-ceramic. The glass-ceramic may be disposed between a first solid polymer electrolyte and a second solid polymer electrolyte that each independently include a component of the above-listed components.

The lithium ion-conductive solid electrolyte may be used as a single layer or a plurality of layers.

The operation principle of the lithium air batteries 10 and 20 according to embodiments of the present disclosure are as follows. During discharging, lithium ions from the anode 14 produce a lithium oxide by reaction with oxygen from the cathode 13, through the reduction of the oxygen (oxygen reduction reaction: ORR). On the other hand, during charging, the lithium oxide is reduced, while oxygen is produced by oxygen evolution reaction (OER).

When the electrolyte is a nonaqueous electrolyte, the reaction mechanism may be represented by Reaction Scheme 1.

Reaction Scheme 1

When the electrolyte is an aqueous electrolyte, the reaction mechanism may be represented by Reaction Scheme 2.

Reaction Scheme 2

As used herein, the term "air" is not limited to atmospheric air, and for convenience, may refer to a combination of gases including oxygen, or pure oxygen gas. This broad definition of "air" also applies to other terms, including "air battery" and "air electrode".

The lithium air battery is available either as a lithium primary battery or a lithium secondary battery. The lithium air battery may have any of various shapes, and in some embodiments, may have a shape like a coin, a button, a sheet, a stack, a cylinder, a plane, or a horn. The lithium air battery may be applicable as a large battery for electric vehicles.

Substituents in the formulae above may be defined as follows.

As used herein, the term "alkyl group" indicates a completely saturated, branched or unbranched (or a straight or linear) hydrocarbon group.

Non-limiting examples of the alkyl group include a methyl group, an ethyl group, a n-propyl group, an isopropyl group, a n-butyl group, an isobutyl group, a sec-butyl group, a t-butyl group, an isopentyl group, a neopentyl group, an iso-amyl group, a n-hexyl group, a 3-methylhexyl group, a 2,2-dimethylpentyl group, a 2,3-dimethylpentyl group, and a n-heptyl group.

At least one hydrogen atom of the alkyl group may be substituted with a halogen atom, a $C_1$-$C_{20}$ alkyl group substituted with a halogen atom (for example, $CCF_3$, $CHCF_2$, $CH_2F$, $CCl_3$, and the like), a $C_1$-$C_{20}$ alkoxy group, a $C_2$-$C_{20}$ alkoxyalkyl group, a hydroxyl group, a nitro group, a cyano group, an amino group, an alkyl amino group, an amidano group, a hydrazine, a hydrazone, a carboxyl group or a salt thereof, a sulfonyl group, a sulfamoyl group, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group.

The term "halogen atom" indicates fluorine, bromine, chloride, iodine, and the like.

As used herein, the term "alkoxy group" represents "alkyl-O-", wherein the alkyl group is the same as described above.

Non-limiting examples of the alkoxy group include a methoxy group, an ethoxy group, a propoxy group, a 2-propoxygroup, a butoxy group, a t-butoxy group, a pentyloxy group, a hexyloxy group, a cyclopropoxy group, and a cyclohexyloxy group.

At least one hydrogen atom in the alkoxy group may be substituted with one of the same substituents as described above in conjunction with the above-described alkyl group.

The unsubstituted alkenyl group indicates an unsaturated alkyl group having at least one carbon-carbon double bond in the center or at a terminal of the unsubstituted alkyl group.

Non-limiting examples of the alkenyl group include an ethenyl group, a propenyl group, a butenyl group, and the like.

At least one hydrogen atom in the unsubstituted alkenyl group may be substituted with one of the same substituents as described above in conjunction with the substituted alkyl group.

The unsubstituted alkynyl group indicates an alkyl group having at least one carbon-carbon triple bond in the center or at a terminal of the above-described alkyl group.

Non-limiting examples of the unsubstituted alkynyl group include an acetylene group, a propylene group, a phenylacetylene group, a naphthylacetylene group, an isopropylacetylene group, a t-butylacetylene group, and a diphenylacetylene group.

At least one hydrogen atom in the alkynyl group may be substituted with one of the same substituents as described above in conjunction with the substituted alkyl group.

As used herein, the term "aryl" group, which is used alone or in combination, refers to an aromatic hydrocarbon containing at least one ring.

The term "aryl" group is construed as including a group with an aromatic ring fused to at least one cycloalkyl ring.

Non-limiting examples of the aryl group include a phenyl group, a naphthyl group, and a tetrahydronaphthyl group.

At least one hydrogen atom in the aryl group may be substituted with one of the same substituents as described above in connection with the alkyl group.

As used herein, the term "heteroaryl group" indicates a monocyclic or bicyclic organic compound including at least one heteroatom selected from among nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring.

In the heteroaryl group, S or N may be present in various oxidized forms.

Non-limiting examples of the monocyclic heteroaryl group include a thienyl group, a furyl group, a pyrrolyl group, an imidazolyl group, a pyrazolyl group, a thiazolyl group, an isothiazolyl group, a 1,2,3-oxadiazolyl group, a 1,2,4-oxadiazolyl group, a 1,2,5-oxadiazolyl group, a 1,3,4-oxadiaxolyl group, a 1,2,3-thiadiazolyl group, a 1,2,4-thiadiazolyl group, a 1,2,5-thiadiazolyl group, a 1,3,4-thiadiazolyl group, an isothiazol-3-yl group, an isothiazol-4-yl group, an isothiazol-5-yl group, an oxazol-2-yl group, an oxazol-4-yl group, an oxazol-5-yl group, an isoxazol-3-yl group, an isoxazol-4-yl group, an isoxazol-5-yl group, a 1,2,4-triazol-3-yl group, a 1,2,4-triazol-5-yl group, a 1,2,3-triazol-4-yl group, a 1,2,3-triazol-5-yl group, a tetrazolyl group, a pyrid-2-yl group, a pyrid-3-yl group, a 2-pyrazin-2-yl group, a pyrazin-4-yl group, a pyrazin-5-yl group, a 2-pyrimidin-2-yl group, a 4-pyrimidin-2-yl group, or a 5-pyrimidin-2-yl group.

The term "heteroaryl" group includes a heteroaromatic ring fused to at least one of an aryl group, a cycloaliphatic group, or a heterocyclic group.

Non-limiting examples of the bicyclic heteroaryl group include an indolyl group, an isoindolyl group, an indazolyl group, an indolizinyl group, a purinyl group, a quinolizinyl group, a quinolinyl group, and an isoquinolinyl group. At least one hydrogen atom of the heteroaryl group may be substituted with one of the same substituents as described above in conjunction with the alkyl group.

The term "sulfonyl" group refers to R"—SO$_2$—, wherein R" may be a hydrogen, an alkyl group, an aryl group, a heteroaryl group, an aryl-alkyl group, a heteroaryl-alkyl group, an alkoxy group, an aryloxy group, a cycloalkyl group, or a heterocyclic group.

The term "sulfamoyl" group may include H$_2$NS(O$_2$)—, an alkyl group-NHS(O$_2$)—, an (alkyl group)$_2$NS(O$_2$)-aryl group-NHS(O$_2$)—, an alkyl group-(aryl group)-NS(O$_2$)—, an (aryl group)$_2$NS(O)$_2$, a heteroaryl group —NHS(O$_2$)—, an (aryl group-alkyl group)-NHS(O$_2$)—, or a (heteroaryl group-alkyl group)-NHS(O$_2$)—.

At least one hydrogen atom of the sulfamoyl group may be substituted with one of the same substituents as described above in conjunction with the alkyl group.

The term "amino group" refers to a group with a nitrogen atom covalently bonded to at least one carbon or heteroatom.

The amino group may include, for example, —NH$_2$ and substituted moieties.

The term "amino group" also comprises an "alkylamino group" with nitrogen bound to at least one additional alkyl group, and "arylamino" and "diarylamino" groups with at least one or two nitrogen atoms bound to an independently selected aryl group.

The term "carbon ring" refers to a cyclic group having 5 to 10 carbon atoms, such as a cyclohexyl group. At least one hydrogen atom in the carbon ring may be substituted with one of the same substituents as described above in connection with the alkyl group.

At least one hydrogen atom in the alkoxycarbonyl group, arylcarbonyl group, and heteroarylcarbonyl group may be substituted with one of the same substituents as described above in connection with the alkyl group.

Hereinafter, one or more exemplary embodiments will be described in detail with reference to the following examples. These examples are not intended to limit the purpose and scope of the present invention. As used herein, an equivalent of a material refers to % by weight. For example, when material A is reacted with 2 equivalents of material B, this means that material A and material B react in a weight ratio of 1:2.

EXAMPLES

Synthesis Example 1

Preparation of Compound (Compound A) of Formula 2 a) Synthesis of Intermediate 1
2,5-bis(hydroxymethyl)-1,4-dioxane-2,5-diol was reacted with 5 equivalents of pyridine and 4.1 equivalents of acetic anhyride to synthesize Intermediate 1.
(b) Synthesis of Intermediate 2
Intermediate 1 was reacted with 3 equivalents of (diethylamino)sulfur trifluoride to synthesize Intermediate 2.

(c) Synthesis of Intermediate 3

Intermediate 2 was reacted with 3 equivalents of NaOMe to synthesize Intermediate 3.

(d) Synthesis of Intermediate 4

Intermediate 3 was reacted with 1.5 equivalents of $Ag_2O$ and 1.2 equivalents of benzyl bromide to synthesize Intermediate 4. In Intermediate 4 represented in the above reaction scheme, Bn indicates a benzyl group.

(e) Synthesis of Intermediate 5

Diethylene glycol was reacted with 2 equivalents of tosyl chloride (TsCl) and 4 equivalents of KOH to synthesize Intermediate 5.

(f) Synthesis of Intermediate 6

Intermediate 4 was mixed with 2 equivalents of Intermediate 5, and then reacted with 5 equivalents of KOH to synthesize Intermediate 6.

(g) Synthesis of Intermediate 7

Intermediate 6 was reacted with $H_2$ in the presence of a Pd/C catalyst to synthesize Intermediate 7.

(h) Synthesis of Intermediate 8

Intermediate 7 was reacted with 2.4 equivalents of NaH, 4 equivalents of carbon disulfide ($CS_2$) and 2.4 equivalents of methyl iodide (MeI) to synthesize Intermediate 8.

(i) Synthesis of Compound A

Intermediate 8 was reacted with 6 equivalents of 1,3-bromo-5,5'-dimethylhydantoin) and 120 equivalents of HF/pyridine to synthesize Compound A (compound of Formula 2).

Comparative Synthesis Example 1

Preparation of Compound B

Compound B was synthesized in the same manner as in Synthesis Example 1, except that tetraethylene glycol as Intermediate 9 was used instead of Intermediate 7 in step (h) to synthesize Intermediate 10, which was then used in step (i) to synthesize Compound B.

Example 1

Preparation of Electrolyte

An electrolyte was prepared by adding 1M of bis(trifluoromethanesulfonyl)imide (LiTFSI) to a compound of Formula 2 (Compound A).

The amount of the compound of Formula 2 (Compound A) was 25 parts by weight based on 100 parts by weight of the total weight of the electrolyte.

Example 2

Manufacture of Lithium Air Battery 40 parts by weight of carbon (Super-P), 10 parts by weight of polytetrafluoroethylene (PTFE), and 50 parts by weight of N-methylpyrrolidone (NMP) were mixed to prepare a cathode slurry, which was then coated and roll-pressed to prepare a cathode sheet. The cathode sheet was pressed to adhere to a stainless mesh, and then vacuum dried in an oven at 100° C. for 120 minutes to obtain a cathode.

A hole was punched in the center of a 5 cm×5 cm-sized polypropylene-coated aluminum film (having a thickness of 200 μm), and was then blocked with a $Li_{1+x+y}Al_xTi_{2-x}Si_yP_{3-y}O_{12}$ (LATP) ($0 \leq x \leq 2$ and $0 \leq y \leq 3$, having a thickness of about 150 μm, available from Ohara corporation) film by using an adhesive, thereby forming a first aluminum film including an LATP region. Next, a second aluminum film having a size of 5 cm×5 cm, a copper current collector (having a thickness of about 20 μm), a lithium foil (1.4 cm×1.4 cm, having a thickness of about 100 μm), a polypropylene-based Celgard-3501 separator (having a thickness of 5 cm×5 cm, available from Celgard) impregnated with the electrolyte solution (including 1M LiTFSI) of Example 1, and the first aluminum film were sequentially stacked upon one another, and then heated in a vacuum to bind together, thereby obtaining a protected lithium anode that is enclosed in the aluminum pouch.

The protected lithium anode was mounted in a side of a stainless case, and the cathode with a polypropylene separator (Celgard-3501, available from Celgard) having a thickness of 25 μm was mounted in the side of the stainless case opposite to the anode. Next, the electrolyte solution of Example 1 was injected between the cathode and the anode, a foamed nickel plate was then disposed on the cathode, and a pressing member that allows air to reach the cathode was pushed to fix a cell, thereby completing the manufacture of a lithium air battery.

Example 3

Preparation of Electrolyte

An electrolyte was prepared in the same manner as in Example 1, except that 20 parts by weight of the compound represented by Formula 2 (Compound A) was used.

Example 4

Preparation of Electrolyte

An electrolyte was prepared in the same manner as in Example 1, except that 97 parts by weight of the compound represented by Formula 2 above was used.

Example 5

Manufacture of Lithium Air Battery

A lithium air battery was manufactured in the same manner as in Example 2, except that the electrolyte according to Example 3 instead of the electrolyte according to Example 1 was used.

Example 6

Manufacture of Lithium Air Battery

A lithium air battery was manufactured in the same manner as in Example 2, except that the electrolyte according to Example 4 instead of the electrolyte according to Example 1 was used.

Comparative Example 1

Preparation of Electrolyte

An electrolyte was prepared by adding 1M of LiTFSI to tetraglyme (TGM).

$$H_3C-(O-CH_2CH_2)_4-O-CH_3 \quad \text{TGM}$$

Comparative Example 2

Preparation of Electrolyte

An electrolyte was prepared by adding 1M of LiTFSI to Compound B.

$$F_3C-(O-CH_2CH_2)_4-O-CF_3 \quad \text{Compound B}$$

Comparative Example 3

Manufacture of Lithium Air Battery

A lithium air battery was manufactured in the same manner as in Example 2, except that the electrolyte of Comparative Example 1, instead of the electrolyte of Example 1, was used.

Comparative Example 4

Manufacture of Lithium Air Battery

A lithium air battery was manufactured in the same manner as in Example 2, except that the electrolyte of Comparative Example 2, instead of the electrolyte of Example 1, was used.

Comparative Example 5

Preparation of Electrolyte

There was an attempt to prepare an electrolyte by adding 1M of LiTFSI to a compound represented by Formula 6.

Formula 6

[Chemical structure of Formula 6: a perfluorinated ether compound]

Comparative Example 6

Preparation of Electrolyte

There was an attempt to prepare an electrolyte by adding 1M of LiTFSI to a compound represented by Formula 7.

Formula 7

Comparative Example 7

Preparation of Electrolyte

There was an attempt to prepare an electrolyte by adding 1M of LiTFSI to a compound represented by Formula 8.

Formula 8

Comparative Example 8

Preparation of Electrolyte

There was an attempt to prepare an electrolyte by adding 1M of LiTFSI to a compound represented by Formula 9.

Formula 9

Comparative Example 9

Preparation of Electrolyte

There was an attempt to prepare an electrolyte by adding 1M of LiTFSI to a compound represented by Formula 10.

Formula 10

In Comparative Examples 5 to 9, it was impossible for the compounds of Formulae 6 to 10 to dissolve the lithium salt (LiTFSI), so that it was impossible to prepare electrolytes.

Evaluation Example 1

Measurement of Electrochemical Oxidation Resistance (Decomposition Initiation Voltage)

The electrolytes of Example 1, Example 3, Example 4, and Comparative Examples 1 and 2 were analyzed by linear sweep voltammetry (LSV).

A Pt electrode as a working electrode, a Pt grid electrode as a counter electrode, and an $Ag/AgNO_3$ electrode as a reference electrode were immersed in a container containing an electrolyte which is to be measured to form a cell for LSV analysis. Scanning of the cell was performed with a voltage from an open circuit voltage (OCV) to 6.5V (with respect to $Ag/Ag^+$) at a scanning rate of 1 mV/s to measure a current value.

Figure 3:
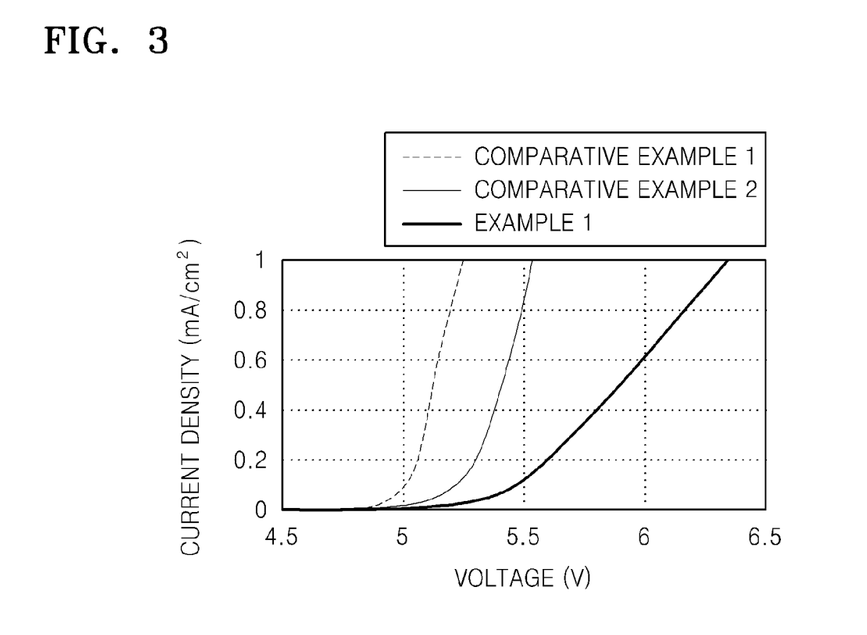
FIG. 3 is a graph of current density (milliamperes per square centimeter, mA/cm$^2$) with respect to voltage (volts, V), obtained from linear sweep voltammetry (LSV) on electrolytes of Example 1, Comparative Example 1, and Comparative Example 2.

FIG. 3 is a graph of current density with respect to voltage, obtained from the LSV analysis of the electrolyte solutions of Example 1, Comparative Example 1, and Comparative Example 2. Referring to FIG. 3, the oxidation voltage was highest for the electrolyte of Example 1 and those of Comparative Examples 2 and 1 were lower than that of Example 1 in this stated order, indicating that the electrolyte of Example 1 has higher electrochemical oxidation resistance than that of Comparative Examples 1 and 2. The "electrochemical oxidation resistance" refers to the stability of an electrolyte at a high voltage.

Also, the electrochemical oxidation resistances of electrolytes according to Examples 3 and 4 had a similar to those of the electrolyte of Example 1.

Evaluation Example 2

Measurement of Chemical Oxidation Resistance

The term "chemical oxidation resistance" refers to the resistance to oxidation of an electrolyte.

20 mg of $Li_2O_2$ was added to 1 mL of each of the electrolytes of Example 1 and Comparative Examples 1 and 2, and then thoroughly mixed therewith. After the mixed solutions were stored at a temperature of about 60° C. for 3 weeks, the amount of $Li_2O_2$ in each of the mixed solutions was measured to calculate a $Li_2O_2$ preservation ratio as a ratio of the amount of $Li_2O_2$ after the storage to the initial amount of $Li_2O_2$ before. The resulting $Li_2O_2$ preservation ratios are shown Table 1.

TABLE 1

| Example | Li$_2$O$_2$ Preservation Ratio (%) |
|---|---|
| Example 1 | 96 |
| Comparative Example 1 | 82 |
| Comparative Example 2 | 89 |

Referring to Table 1, the Li$_2$O$_2$ preservation ratio was highest for the electrolyte of Example 1 and those of Comparative Examples 2 and 1 were lower than that of Example 1 in this stated order, indicating that the reactivity with Li$_2$O$_2$ was lowest in the electrolyte solution of Example 1 and highest in the electrolyte solution of Comparative Example 1. In other words, the electrolyte solution of Example 1 has a highest chemical oxidation resistance and the electrolyte solution of Comparative Example 1 has a lowest chemical oxidation resistance.

Evaluation Example 3

Evaluation of Charge-Discharge Characteristics

Figure 4:
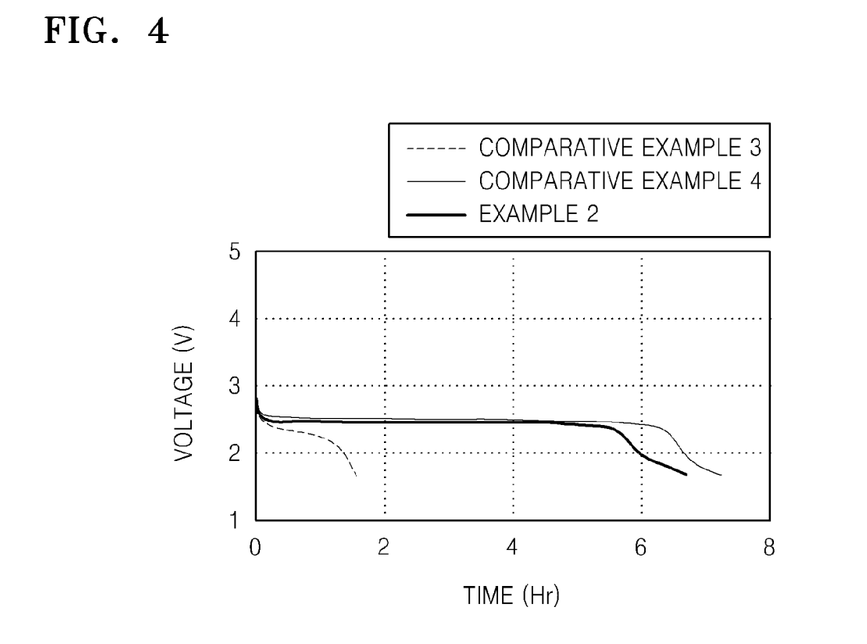
FIG. 4 is a graph of potential difference (volts, V) with respect to discharge time (hours, Hr) in lithium air batteries of Example 2 and Comparative Examples 3 and 4.

The lithium air batteries of Example 2, Example 5, Example 6, Comparative Example 3, and Comparative Example 4 were discharged in an oxygen atmosphere of 1 pressure at 60° C., at a constant current of 0.24 mA/cm$^2$ to 1.7V (with respect to Li), and then charged at a constant current to 4.2V, and then at a constant voltage of 4.2V to a current of 0.1 mA/cm$^2$. The results of measuring voltage with respect to time during the discharging to 1.7V are shown in FIG. 4. Referring to FIG. 4, the voltage of the lithium air battery of Comparative Example 3 rapidly reduces with respect to time, while the voltages of the lithium air batteries of Example 2 and Comparative Example 4 are maintained constant longer than Comparative Example 3.

Also, the charge-discharge characteristics of the lithium air batteries according to Examples 5 and 6 had a similar to those of the lithium air batteries of Example 2.

The rapid reduction in discharge voltage of the lithium air battery of Comparative Example 3 is attributed to the reaction of Li$_2$O$_2$ produced in the cathode with the electrolyte during the discharging blocks reversible oxidation and reduction of Li$_2$O$_2$ in the electrode. The maintenance of the discharge voltages of the lithium air batteries of Example 2 and Comparative Example 4 is attributed to that suppressed reaction between Li$_2$O$_2$ and the electrolyte improves the oxygen affinity of the electrolyte, and thus facilitates the supply of oxygen to the electrode.

As described above, according to the one or more of the above exemplary embodiments, an electrolyte for a lithium air battery may include a compound of Formula 1 that includes a fluorine group in a selected position, and thus may have improved oxidation resistance, improved salt solubility, and improved oxygen affinity.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An electrolyte for a lithium air battery, the electrolyte comprising a compound represented by Formula 1 and a lithium salt:

Formula 1 wherein, in Formula 1,
R$_1$ and R$_2$ are each independently a hydrogen atom or a substituted or unsubstituted methyl group represented as —CR$_{15}$R$_{16}$R$_{17}$;
R$_3$ to R$_{17}$, and R$_{20}$ to R$_{21}$ are each independently a hydrogen atom, a halogen atom, a nitro group, a cyano group, a carboxyl group, a substituted or unsubstituted C$_1$-C$_{20}$ alkyl group, a substituted or unsubstituted C$_6$-C$_{30}$ aryl group, or a substituted or unsubstituted C$_3$-C$_{20}$ heteroaryl group;
at least one of R$_{18}$ and R$_{19}$ is each independently a fluorine atom, a C$_1$-C$_{10}$ alkyl group that is partially or fully substituted with fluorine, an unsubstituted C$_1$-C$_{10}$ alkyl group, or a C$_6$-C$_{30}$ aryl group that is partially or fully substituted with fluorine, and the remaining R$_{18}$ or R$_{19}$ is a hydrogen atom, a unsubstituted or substituted C$_1$-C$_{10}$ alkyl group, or an unsubstituted or substituted C$_6$-C$_{30}$ aryl group, wherein, optionally, R$_{20}$ and R$_{21}$ form a substituted or unsubstituted C$_3$-C$_8$ ring, and optionally R$_{18}$ and R$_{19}$ form a C$_3$-C$_8$ ring that is partially or fully substituted with fluorine or is unsubstituted;
m is in a range of 1 to 1,000,000;
n is in a range of 2 to 1,000,000; and
p is 1 to 1,000,000, wherein m+n+p≥4.

2. The electrolyte of claim 1, wherein R$_1$ and R$_2$ are each independently a methyl group, an ethyl group, a propyl group, a fluoromethyl group, a difluoromethyl group, a trifluoromethyl group, a fluoroethyl group, a difluoroethyl group, a trifluoroethyl group, a tetrafluoroethyl group, a pentafluoroethyl group, a fluoropropyl group, a difluoropropyl group, a trifluoropropyl group, a tetrafluoropropyl group, a pentafluoropropyl group, a hexafluoropropyl group, or a heptafluoropropyl group.

3. The electrolyte of claim 1, wherein R$_3$ to R$_{17}$ are each independently a hydrogen atom, a methyl group, an ethyl group, a propyl group, a butyl group, a pentyl group, a hexyl group, or a heptyl group.

4. The electrolyte of claim 1, wherein at least one of R$_{20}$ and R$_{21}$ are each independently a fluorine atom, a C$_1$-C$_{10}$ alkyl group that is partially or fully substituted with fluorine, or a C$_6$-C$_{30}$ aryl group that is partially or fully substituted with fluorine, and the remaining R$_{20}$ or R$_{21}$ is a hydrogen atom, a unsubstituted or substituted C$_1$-C$_{10}$ alkyl group, or a unsubstituted or substituted C$_6$-C$_{30}$ aryl group, wherein optionally R$_{20}$ and R$_{21}$ form a C$_3$-C$_8$ ring that is partially or fully substituted with fluorine.

5. The electrolyte of claim 1, wherein at least one of R$_{18}$ to R$_{21}$ is each independently a fluorine atom, a fluoromethyl group, a difluoromethyl group, a trifluoromethyl group, a fluoroethyl group, a difluoroethyl group, a trifluoroethyl group, a tetrafluoroethyl group, a pentafluoroethyl group, a fluoropropyl group, a difluoropropyl group, a trifluoropropyl group, a tetrafluoropropyl group, a pentafluoropropyl group, a hexafluoropropyl group, or a heptafluoropropyl group, and the remaining $R_{18}$ to $R_{21}$ is a hydrogen, a methyl group, an ethyl group, a propyl group, or a phenyl group, wherein optionally $R_{18}$ and $R_{19}$ and optionally $R_{20}$ and $R_{21}$ form a cyclopropane, a cyclobutane, a cyclopentane, a cyclohexane, a cycloheptane, a cyclonorbornane or a bicyclooctane ring that is fully or partially substituted with fluorine, and the remaining $R_{18}$ and $R_{19}$ or $R_{20}$ and $R_{21}$ form a unsubstituted cyclopropane, a unsubstituted cyclobutane, a unsubstituted cyclopentane, a unsubstituted cyclohexane, a unsubstituted cycloheptane, a unsubstituted cyclonorbornane, or a unsubstituted bicyclooctane.

6. The electrolyte of claim 1, wherein m is in a range of 1 to 1,000, n is in a range of 2 to 1,000, and p is in a range of 1 to 1,000.

7. The electrolyte of claim 1, wherein the compound of Formula 1 is a compound represented by Formula 1a:

Formula 1a wherein, in Formula 1a, $R_{18}$ to $R_{21}$ are each independently a fluorine atom, a partially or fully fluorinated $C_1$-$C_{10}$ alkyl group, or a partially or fully fluorinated $C_6$-$C_{20}$ aryl group; and $R_{15}$, $R_{16}$, and $R_{17}$ are each independently a hydrogen or a substituted or unsubstituted $C_1$-$C_{20}$ alkyl group.

8. The electrolyte of claim 1, wherein the compound of Formula 1 is a compound represented by Formula 1b:

Formula 1b wherein, in Formula 1b, $R_{18}$ to $R_{21}$ are each independently a fluorine atom, a partially or fully fluorinated $C_1$-$C_{10}$ alkyl group or a partially or fully fluorinated $C_6$-$C_{20}$ aryl group;

R is a hydrogen or fluorine; and k is in a range of 0 to 5.

9. The electrolyte of claim 1, wherein the compound of Formula 1 is selected from compounds represented by Formulas 2 to 5:

10. The electrolyte of claim 1, wherein an amount of the compound of Formula 1 is in a range of about 15 parts to about 97 parts by weight, based on 100 parts by weight of a total weight of the electrolyte.

11. The electrolyte of claim 1, wherein the lithium salt is a lithium sulfonimide compound.

12. The electrolyte of claim 11, wherein the lithium sulfonimide compound comprises a lithium fluoroalkylsulfonimide, a lithium fluoroarylsulfonimide, or a lithium fluoroalkylarylsulfonimide.

13. The electrolyte of claim 11, wherein the lithium sulfonimide compound comprises $Li(FSO_2)_2N$, $Li(CF_3SO_2)_2N$, $Li(C_2F_5SO_2)_2N$, $LiN(C_pF_{2p+1}SO_2)(C_qF_{2q+1}SO_2)$ wherein p and q differ and p and q are each independently an integer of 1 to 20, $LiN((SO_2)_2C_pF_{2p})$ wherein p is an integer of 1 to 10, $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$ wherein p is an integer of 1 to 10, or $LiN(C_{10}F_7SO_2)(C_pF_{2p+1}SO_2)$ wherein p is an integer of 1 to 10.

14. The electrolyte of claim 1, wherein the electrolyte further comprises a nonaqueous organic solvent.

15. A lithium air battery comprising:
an anode;
a cathode; and
the electrolyte of claim 1 comprising a lithium salt and a compound represented by Formula 1 of claim 1.

16. The lithium air battery of claim 15, wherein the cathode is partially or fully impregnated with the electrolyte.

17. The lithium air battery of claim 15, further comprising a lithium ion-conductive layer disposed between an anode and the electrolyte, and an ion-conductive inorganic particle.

18. The lithium air battery of claim 17, wherein the ion-conductive inorganic particle is a glassy active metal ion conductor, an amorphous active metal ion conductor, a ceramic active metal ion conductor, a glass-ceramic active metal ion conductor, or a combination thereof.

19. The lithium air battery of claim 17, wherein the ion-conductive inorganic particle is $Li_{1+x+y}Al_xTi_{2-x}Si_yP_{3-y}O_{12}$ wherein $0<x<2$ and $0\leq y<3$, $BaTiO_3$, $Pb(Zr_xTi_{1-x})O_3$ wherein $0<x<1$, $Pb_{1-x}La_xZr_{1-y}Ti_yO_3$ wherein $0\leq x<1$ and $0\leq y<1$, $Pb(Mg_3Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_xTi_y(PO_4)_3$ wherein $0<x<2$ and $0<y<3$, $Li_xAl_yTi_z(PO_4)_3$ wherein $0<x<2$, $0<y<1$, and $0<z<3$, $Li_{1+x+y}(Al, Ga)_x(Ti, Ge)_{2-x}Si_yP_{3-y}O_{12}(O_y, Ge)$ wherein $0<y<1$, $Li_xLa_yTiO_3$ wherein $0<x<2$ and $0<y<3$, lithium germanium thiophosphate, $Li_xGe_yP_zS_w$, wherein $0<x<4$, $0<y<1$, $0<z<1$, and $0<w<5$, a lithium nitride glass, $Li_xN_y$ wherein $0<x<4$ and $0<y<2$, a $SiS_2(Li_xSi_yS_z)$ glass wherein $0<x<3$, $0<y<2$, and $0<z<4$, a $P_2S_5(Li_xP_yS_z)$ glass wherein $0<x<3$, $0<y<3$, and $0<z<7$, $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, $Li_{3+x}La_3M_2O_{12}$, wherein $0\leq x\leq 5$ and wherein M is Te, Nb, or Zr, or a combination thereof.

20. The lithium air battery of claim 17, further comprising a second electrolyte disposed between the anode and the lithium ion-conductive layer.

21. The lithium air battery of claim 20, wherein the second electrolyte is a solid polymer electrolyte or an inorganic solid electrolyte.

22. An electrolyte for a lithium air battery, the electrolyte comprising a compound represented by Formula 1 and a lithium salt:

Formula 1 wherein, in Formula 1,
$R_1$ and $R_2$ are each independently a hydrogen atom or a substituted or unsubstituted methyl group represented as —$CR_{15}R_{16}R_{17}$;
$R_3$ to $R_{17}$ are each independently a hydrogen atom, a methyl group, an ethyl group, a propyl group, a butyl group, a pentyl group, a hexyl group, or a heptyl group;
$R_{20}$ to $R_{21}$ are each independently a hydrogen atom, a halogen atom, a nitro group, a cyano group, a carboxyl group, a substituted or unsubstituted $C_1$-$C_{20}$ alkyl group, a substituted or unsubstituted $C_6$-$C_{30}$ aryl group, or a substituted or unsubstituted $C_3$-$C_{20}$ heteroaryl group;
at least one of $R_{18}$ and $R_{19}$ is each independently a fluorine atom, a $C_1$-$C_{10}$ alkyl group that is partially or fully substituted with fluorine, an unsubstituted $C_1$-$C_{10}$ alkyl group, or a $C_6$-$C_{30}$ aryl group that is partially or fully substituted with fluorine, and the remaining $R_{18}$ or $R_{19}$ is a hydrogen atom, a unsubstituted or substituted $C_1$-$C_{10}$ alkyl group, or an unsubstituted or substituted $C_6$-$C_{30}$ aryl group, wherein, optionally, $R_{20}$ and $R_{21}$ form a substituted or unsubstituted $C_3$-$C_8$ ring, and optionally $R_{18}$ and $R_{19}$ form a $C_3$-$C_8$ ring that is partially or fully substituted with fluorine or is unsubstituted;
m is in a range of 1 to 1,000,000;
n is in a range of 1 to 1,000,000; and
p is 0 to 1,000,000, wherein m+n+p≥3.

23. An electrolyte for a lithium air battery, the electrolyte comprising a compound represented by Formula 1 and a lithium salt:

Formula 1 wherein, in Formula 1,
$R_1$ and $R_2$ are each independently a hydrogen atom or a substituted or unsubstituted methyl group represented as —$CR_{15}R_{16}R_{17}$;
$R_3$ to $R_{17}$ are each independently a hydrogen atom, $C_1$-$C_{20}$ alkyl group, $C_6$-$C_{30}$ aryl group, or $C_3$-$C_{20}$ heteroaryl group;
wherein at least one of $R_{20}$ and $R_{21}$ are each independently a fluorine atom, a $C_1$-$C_{10}$ alkyl group that is partially or fully substituted with fluorine, or a $C_6$-$C_{30}$ aryl group that is partially or fully substituted with fluorine, and the remaining $R_{20}$ or $R_{21}$ is a hydrogen atom, a unsubstituted or substituted $C_1$-$C_{10}$ alkyl group, or a unsubstituted or substituted $C_6$-$C_{30}$ aryl group, wherein optionally $R_{20}$ and $R_{21}$ form a $C_3$-$C_8$ ring that is partially or fully substituted with fluorine;
at least one of $R_{18}$ and $R_{19}$ is each independently a fluorine atom, a $C_1$-$C_{10}$ alkyl group that is partially or fully substituted with fluorine, an unsubstituted $C_1$-$C_{10}$ alkyl group, or a $C_6$-$C_{30}$ aryl group that is partially or fully substituted with fluorine, and the remaining $R_{18}$ or $R_{19}$ is a hydrogen atom, a unsubstituted or substituted $C_1$-$C_{10}$ alkyl group, or an unsubstituted or substituted $C_6$-$C_{30}$ aryl group, wherein, optionally, $R_{20}$ and $R_{21}$ form a substituted or unsubstituted $C_3$-$C_8$ ring, and optionally $R_{18}$ and $R_{19}$ form a $C_3$-$C_8$ ring that is partially or fully substituted with fluorine or is unsubstituted;

m is in a range of 1 to 1,000,000;

n is in a range of 2 to 1,000,000; and p is 1 to 1,000,000, wherein m+n+p≥4.

* * * * *